US005266771A

United States Patent [19]

Van Wyk

[11] Patent Number: 5,266,771

[45] Date of Patent: Nov. 30, 1993

[54] ORNAMENT HAVING PATTERNED ORNAMENTAL INDICIA THEREON, AND METHOD AND APPARATUS FOR FABRICATING SAME

[75] Inventor: Robert A. Van Wyk, North Palm Beach, Fla.

[73] Assignees: AMF Irrevocable Trust, Grand Rapids, Mich.; KMA Irrevocable Trust, Palm Beach Gardens, Fla.

[21] Appl. No.: 802,521

[22] Filed: Dec. 5, 1991

[51] Int. Cl.[5] .............................................. B23K 26/00

[52] U.S. Cl. .............................. 219/121.69; 362/806; 428/11

[58] Field of Search ...................... 219/121.68, 121.69; 428/11; 362/806

[56] References Cited

U.S. PATENT DOCUMENTS

| | | | |
|---|---|---|---|
| 3,663,793 | 5/1972 | Petro et al. | 219/121.69 |
| 3,701,880 | 10/1972 | Rively et al. | 219/121.69 |
| 4,190,759 | 2/1980 | Hongo et al. | 219/121.69 |
| 4,833,580 | 5/1989 | Allen | 362/806 X |

*Primary Examiner*—C. L. Albritton

*Attorney, Agent, or Firm*—Bell, Seltzer, Park & Gibson

[57] ABSTRACT

An ornament includes a hollow ornament body having an inner coating layer in which a pattern is formed, to form an ornamental indicia for the ornament. The pattern in the inner coating layer may be a pattern of openings or a pattern of discolorations. The pattern in the inner coating layer may be formed by directing a laser beam through the hollow ornament body into the inner coating layer in a predetermined pattern. The laser beam may vaporize the inner coating layer or discolor the inner coating layer without harming the body of the ornament. The laser may be a Nd:YAG marking laser. Input patterns are provided to the laser after conversion from planar to spheroidal coordinates so that a pattern may be produced in the inner coating layer without distortion. When illuminated from within, the ornament produces a unique appearance because the ornamental indicia is illuminated due to the removal or discoloration of the inner coating layer.

16 Claims, 5 Drawing Sheets

ORNAMENT HAVING PATTERNED ORNAMENTAL INDICIA THEREON, AND METHOD AND APPARATUS FOR FABRICATING SAME

FIELD OF THE INVENTION

This invention relates to decorative ornaments, including, but not limited to holiday ornaments such as Christmas, Easter, Halloween or Hanukkah ornaments, and other illuminated glass or plastic vessels, and methods and apparatus for fabricating same.

BACKGROUND OF THE INVENTION

Christmas ornaments have heretofore been made of a hollow ornament body, typically formed of glass or plastic in a spheroidal shape, which is adapted for hanging from a Christmas tree or other Christmas display. The ornament body is silvered and lacquered in a machine, commonly referred to as an "S&L machine", which coats the inner surface of the hollow body with silver, and coats the outer surface of the hollow body with a coating layer of desired color and other characteristics.

The inner silver coating layer reflects external light to provide a bright, mirrored ornament. The outer coating layer may be a clear coating layer to provide a reflecting silver ornament. Alternatively, the outer coating layer may be a relatively transparent, glossy finish paint to provide a colored effect. The outer layer may also be a relatively opaque matte finished layer to provide a more subdued effect.

It is often desirable to place an ornamental indicia, such as a Christmas scene or a Christmas greeting, on the Christmas ornament. This has typically been done by painting the requisite indicia on the outside of the ornament or by blasting a pattern in the outer coating layer of the ornament.

Unfortunately, these techniques for forming indicia on the Christmas ornament do not present an entirely satisfactory appearance. When the indicia is painted on the outside of the ornament, it adds another coating layer to the ornament, so that the indicia is dark and drab. Alternatively, when the outer coating layer is blasted or removed to create the indicia, the inner silver coating layer is still present and causes the indica to be dark. In either case, the appearance of the ornament is not entirely satisfactory.

SUMMARY OF THE INVENTION

It is therefore an object of the invention to provide an improved ornament having a patterned ornamental indicia thereon.

It is another object of the invention to provide an improved method and apparatus for forming ornaments having patterned ornamental indicia thereon.

It is yet another object of the present invention to provide an ornament having a patterned indicia thereon, in which the indicia presents a high contrast to the ornament body.

These and other objects are provided according to the present invention by an ornament having a hollow ornament body and an inner coating layer on the inner surface thereof, in which a pattern is formed in the inner coating layer to form an ornamental indicia for the ornament. The pattern in the inner coating layer may be a pattern of openings or a pattern of discolorations in the inner coating layer. In contrast with known ornaments, the pattern is formed in the inner coating layer, so that light from a light source inside the hollow ornament body shines through the inner coating layer and provide an illuminated ornamental indicia for the ornament. A pattern may also be formed in the outer coating layer, congruent to or different from the pattern formed in the inner coating layer.

The ornament having a predetermined pattern in the inner coating layer may be formed by directing a laser beam through the hollow ornament body onto the inner coating layer in a predetermined pattern, to form the predetermined pattern in the inner coating layer. The laser beam may vaporize the inner coating layer according to the predetermined pattern, to form an opening in the inner coating layer having the predetermined pattern. Alternatively, the laser beam may discolor the inner coating layer according to the predetermined pattern, to form a discoloration in the inner coating layer.

In sharp contrast to known techniques for forming a pattern on the outside layer, the laser allows a pattern to be formed inside the ornament body, in the silver inner coating layer, without harming the body of the ornament. The laser parameters and paint composition may be selected to also form the corresponding pattern on the outer coating layer, or may be selected so that the laser does not affect the outer coating layer. The laser is preferably a well known Nd:YAG laser whose wavelength views the glass and paint as transparent, but views the silver inner coating layer as opaque. The laser therefore vaporizes the silver inner layer or discolors the silver inner layer, but not the outer layer. Alternatively, an opaque matte finish outer layer paint will also be removed by the laser during removal of the silver inner layer.

The pattern may be formed in the ornament body using a laser, by controlling relative movement between the laser beam and a fixture for holding a ornament in the optical path of the laser. Relative movement may be controlled by using a stationary laser beam and moving the ornament according to the predetermined pattern. Preferably, however, the laser beam motion is controlled using a well known laser controller to move the laser on a stationary ornament body according to the predetermined pattern.

In order to provide the requisite control pattern to the laser beam, a planer pattern is defined and then converted into a nonplanar pattern so that the pattern may be produced on the nonplanar (spherical) hollow body without distortion. The converted planer pattern is applied to the laser control circuits, so that the laser beam forms the pattern in the inner coating layer.

The ornament formed according to the present invention possesses a unique appearance of glowing ornamental indicia, due to the removal or discoloration of the inner silver coating layer. The ornament may be manufactured from conventional silvered and lacquered ornament bodies using a known Nd:YAG marking laser. The inner silver coating layer may need to be thicker than typical, in order to accommodate laser marking thereof. A unique ornament having greatly improved appearance may thereby be mass produced. The ornament may be a Christmas ornament, which is adapted for hanging from a Christmas tree, or an Easter, Halloween, Hanukkah or special event ornament. The ornament may also be any internally illuminated hollow body such as a hurricane lamp or decorative light bulb, having illuminated indicia thereon.

DETAILED DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
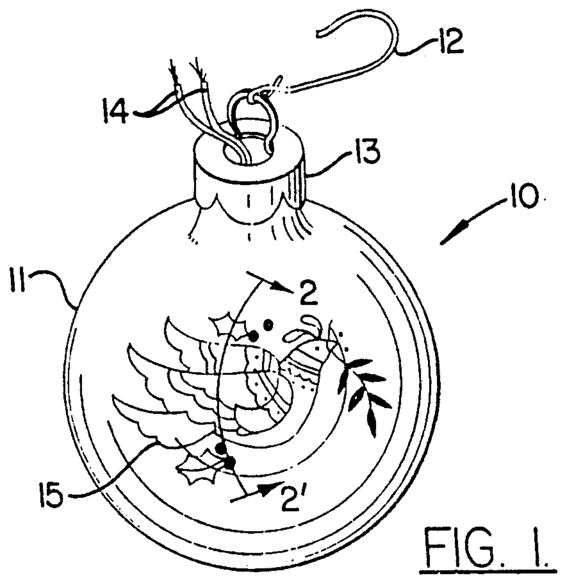
FIG. 1 is a perspective view of a Christmas ornament according to the present invention.

Referring now to FIG. 1, a Christmas ornament 10 according to the present invention is shown. Christmas ornament 10 includes a hollow ornament body 11 Which is typically spheroidal in shape. Body 11 is adapted for hanging from a Christmas tree or the like by a hook 12 or other means, which is attached to a protruding neck 13 on body 11. A pair of electrical leads 14 provides power to a light source within the hollow body (not shown in FIG. 1). The electrical leads 14 may be arranged to plug into a conventional Christmas tree light set in a manner well known to those having skill in the art. As also shown in FIG. 1, Christmas ornament 10 includes an ornamental indicia 15 such as a Christmas scene thereon. Multiple indicia may also be placed on the Christmas ornament.

Figure 2A:
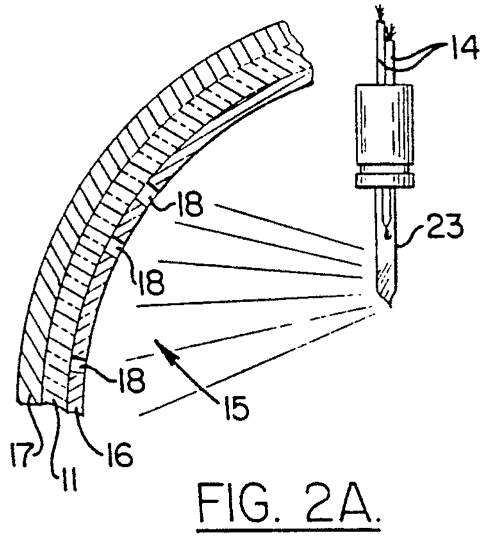
FIGS. 2A-2D are cross sectional views taken along line 2—2' of FIG. 1, showing alternative embodiments of the present invention.
Figure 2B:
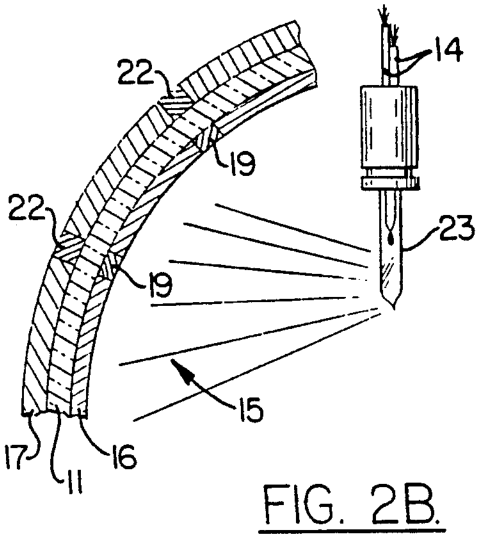
Figure 2C:
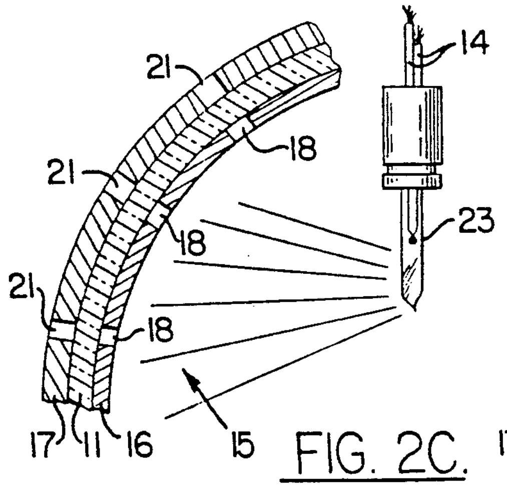
Figure 2D:
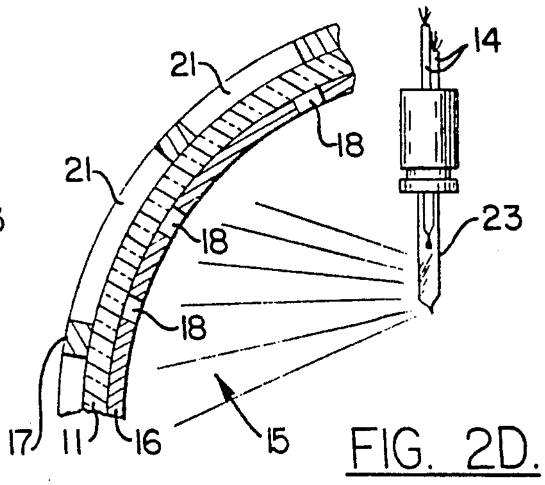

FIGS. 2A-2D are cross sectional views of the hollow ornament body 11 along line 2—2' of FIG. 1, and illustrate the unique ornamental indicia of the present invention. As shown in FIGS. 2A-2D, the hollow ornament body 11 includes an inner coating layer 16 and an outer coating layer 17. According to the invention, the ornamental indicia 15 is formed by forming a pattern of openings 18 in inner coating layer 16 (shown in FIGS. 2A, 2C and 2D), or a pattern of discolorations 19 in inner coating layer 16 as shown in FIG. 2B. As shown in FIG. 2A, outer coating layer 17 may be free of openings or discolorations therein. Alternatively, as shown in FIG. 2B, outer coating layer may have discolorations 22 formed therein. As shown in FIG. 2C, outer coating layer may have openings formed therein. The openings or discolorations in the outer coating layer may be congruent to those of the inner coating layer as shown in FIGS. 2B and 2C. Alternatively, a first pattern of openings or discolorations may be formed in the inner layer 16, and a second pattern of openings or discolorations may be formed in the outer layer 17 as shown in FIG. 2D. As shown in FIGS. 2A-2D, a light source 23, typically a standard Christmas light may be used to illuminate the pattern of openings or discolorations from within the hollow ornament body, to provide an illuminated ornamental indicia on the Christmas ornament.

As is well known to those having skill in the art, the hollow ornament body 11 is typically glass or plastic which is clear and spheroidal, although colored glass or plastic and any hollow shape may be used. Typically, the inner coating 16 is a reflective metallic (silver) coating. Typically outer coating 17 is a colored, paint-type coating. However, it will be understood by those having skill in the art that metallic coatings may be used on the outside and paint coatings may be used on the inside, and multiple inner and outer coating layers of various combinations may also be provided.

The predetermined pattern in the inner coating layer is formed by directing a laser beam through the hollow body onto the inner coating layer in the predetermined pattern. A laser marking system may be used to form the Christmas ornaments of the present invention. The laser marking system produces a pattern in the inner coating by effecting the surface of the inner coating with a laser beam. The surface effect produced may be erosion of the surface through melting and/or vaporization, to produce the openings 18 in the inner coating layer as shown in FIGS. 2A, 2C and 2D. Alternatively, discoloration of the surface through oxidation and heat effects may be produced, to produce a pattern of discolorations 19 in the inner coating layer as shown in FIG. 2B.

Figure 3:
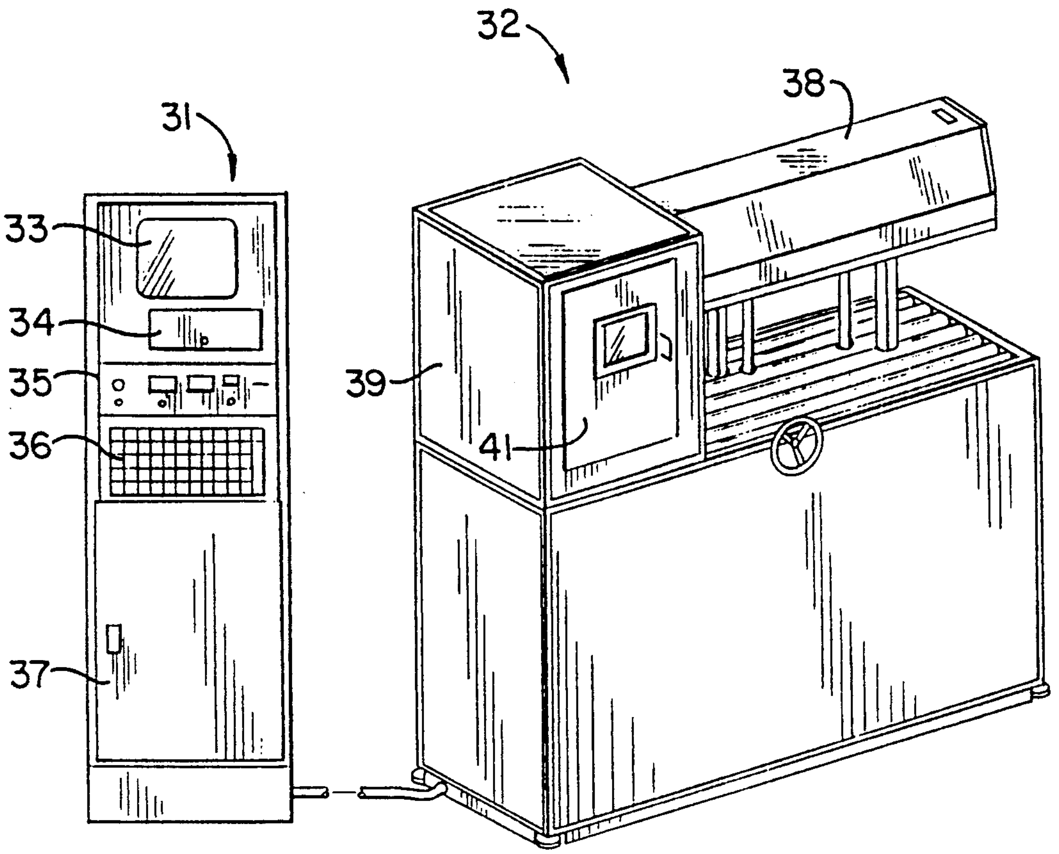
FIG. 3 is a schematic illustration of a laser marking system which may be used to fabricate Christmas ornaments according to the present invention.

Referring to FIG. 3, the laser marking system 30 consists of a control unit 31 and a laser marking head 32. Commercially available laser marking systems may be used, such as the laser marking system marketed under the designation "Instamark Elite" by Control Laser Corporation, Orlando, Fla. This well known laser marketing system includes a standard 50 watt Nd:YAG laser.

Still referring to FIG. 3, the control unit 31 includes circuitry for producing a laser beam having the power and modulation specified by the machine operator, and circuitry for sending the required electronic signals to the laser head to direct the beam along the specified path on the object to be marked. The laser head contains galvanically controlled mirrors which direct the beam according to the signals received from the laser motion control unit. The control unit 31 includes a cathode ray tube or other display 33, one or more floppy disk drives and/or hard disk drives 34, controls and indicators 35, a keyboard 36 and a water chiller 37 for cooling the laser. The laser marking head 32 includes a laser covered by a protective cover 38, and a work enclosure 39 for placing the work piece therein. A door 41 provides access to the work enclosure.

Figure 4:
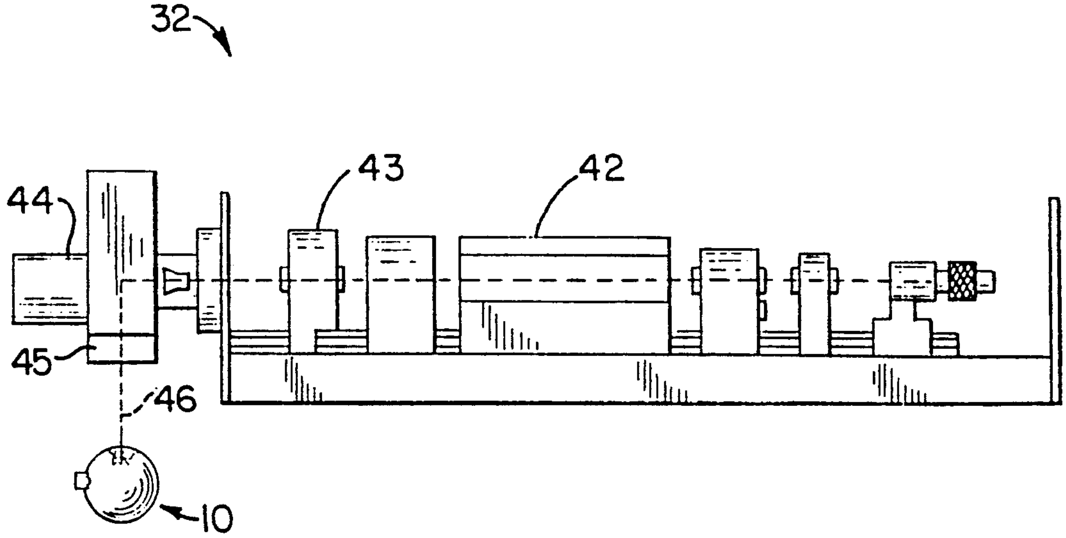
FIG. 4 is a schematic diagram of the laser marking head of FIG. 3.

Referring now to FIG. 4, a schematic diagram of the laser marking head 32 is shown. The laser marking head includes a laser 42 and a fail safe shutter 43. A scanner head 44 includes mirrors (not shown) which are galvanically controlled by control signals from the control unit 31, for directing the laser beam 46 along a predetermined optical path. A focusing lens 45 is also included for focusing the emerging laser beam 46 onto the Christmas ornament 10.

In order to laser mark an object, a program is entered into the laser control unit 31 to specify the geometry of the mark to be produced. The proper laser control parameters are also entered into the laser control unit 31, and the laser control unit is then activated to produce the mark on the object.

The geometrical programming of the laser includes specifying the positioning moves and lasing paths for the laser beam. The laser is shut off by the laser control system 31 during positioning moves. It is activated when executing lasing paths. The paths may consist of straight lines or circular interpolations. Most laser marking systems also contain internal programming for producing standard alphanumeric marks at a programmed location when specified by the operator.

Geometrical programming of the laser may be accomplished by manual input at the system keyboard 36 or by translating a program produced using Computer Aided Design (CAD) software. When the latter method is used, a translator program is used to convert the geometric information in the CAD program to the proper form required by the laser's geometric control. The programming of a laser marking system using manual input at a keyboard or using a CAD file is well known to those having skill in the art and need not be described further herein.

The laser controller has two primary variables: lamp current and Q-switch output frequency. In the Nd:YAG type lasers used generally for marking, the laser is excited by a flash lamp in the laser cavity. The greater the level of lamp current, the greater the level of excitation of the laser and the greater the laser output power. Q-switch frequency is adjustable from approximately 1 kHz to 25 kHz. The Q-switch frequency generally determines the effect of the laser on the surface being lased. At low frequencies (less than about 3 kHz), melting and vaporization are more likely to occur, thereby producing erosion of the surface being lased. Low Q-switch frequencies may be used to produce the pattern of openings in the inner layer 16 as shown in FIGS. 2A, 2C and 2D. At high Q-switch frequencies (more than about 5 kHz), it is possible to produce a high degree of surface heating without the erosion of material, to produce discolorations in the inner layer as shown in FIG. 2B.

A Nd:YAG type laser such as the Control Laser Corporation Instamark Elite operates at a laser wavelength of 1.06$\mu$m. At this frequency, the laser is transparent to the glass or plastic hollow ornament body 11 and is opaque to the inner metallic coating layer 16. The laser is transparent to an optically transparent outer Coating layer 17 shown in FIG. 2A, so that indicia will not be formed therein. The laser is opaque to an optically opaque paint, so that the paint will be removed or discolored along with the inner coating layer, as shown in FIGS. 2B and 2C. The ornament shown in FIG. 2D may be formed by using an outer coating layer 17 which is transparent to the laser and then using a second laser or other etching technique to etch the second pattern 21 in the outer coating layer. It will be understood by those having skill in the art that $CO_2$ or solid state lasers may also be used.

In laser marking the pattern on the Christmas ornament, the ornament body must be precisely positioned relative to the laser beam so that the ornamental indicia may accurately be positioned relative to the neck 13 of the spheroidal ornament body. Positioning is also important when multiple indicia are formed on the ornament body. Precise positioning may be accomplished by using one or more positioning fixtures as will be described below. Alternatively, a robotic arm may be used to manipulate the ornament body relative to laser beam 46 (FIG. 4). If a robotic arm is used, the predetermined indicia pattern may be programmed into the robotic arm rather than into the laser controller.

As described above, positioning and orientation of the hollow ornament body may be accomplished by means of special holding fixtures. The marking of the ornament is accomplished in several steps. These steps may be performed so that features marked first in the sequence can be used to locate the object for the marking performed in later steps. In the description to follow, the section of the ornament adjacent the protruding neck 13 will be referred to as the top of the ornament, while the section opposite the neck will be referred to as the bottom of the ornament. This nomenclature reflects the positioning of the ornament when it is hung from a Christmas tree or the like during its intended use.

Figure 5A:
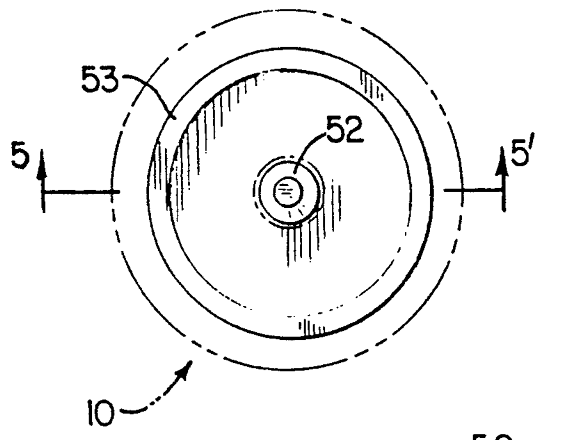
FIGS. 5A and 5B are a top cross-sectional view and a side cross-sectional view, respectively, of a fixture for use in fabricating Christmas ornaments according to the present invention.
Figure 5B:
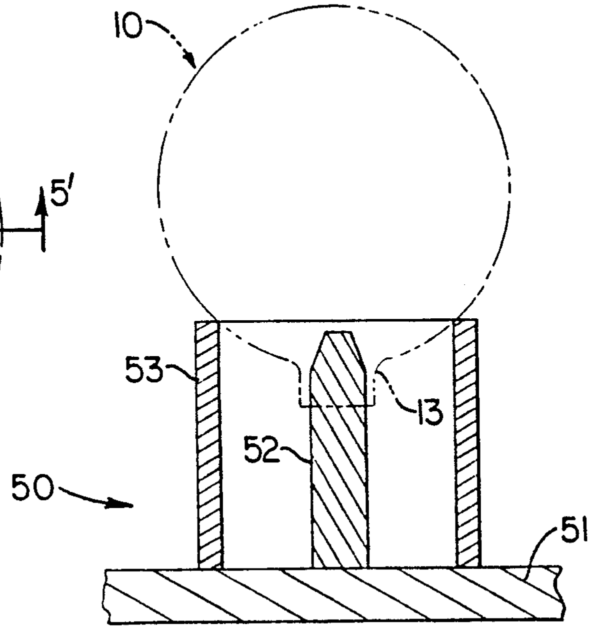

In a typical first operation, the bottom of the ornament is marked with either text or an identification of the ornament manufacturing company. This text or identifying indicia has a length to height ratio which is sufficient to make its orientation apparent to those handling the ornament for succeeding operations. Orientation and positioning of the ornament for this operation may be accomplished by the first fixture 50 shown in FIGS. 5A and 5B. Fixture 50 positions the ornament body at the proper height and at the proper position with reference to the laser beam. It also insures that the neck 13 is pointed downward. The fixture accomplishes this by means of a round nest 53 with a protruding pilot 52 in the base of the fixture 51. Assuming that the laser beam is directly at the ornament vertically downward, as shown in FIG. 4, fixture 50 allows marking of the bottom of the ornament.

Figure 6C:
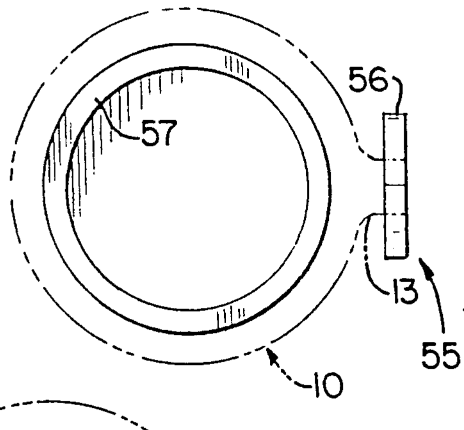
FIGS. 6A-6C are a front cross-sectional view, a side cross-sectional view and a top cross-sectional view of a second fixture which may be used to fabricate a Christmas ornament according to the present invention.
Figure 6A:
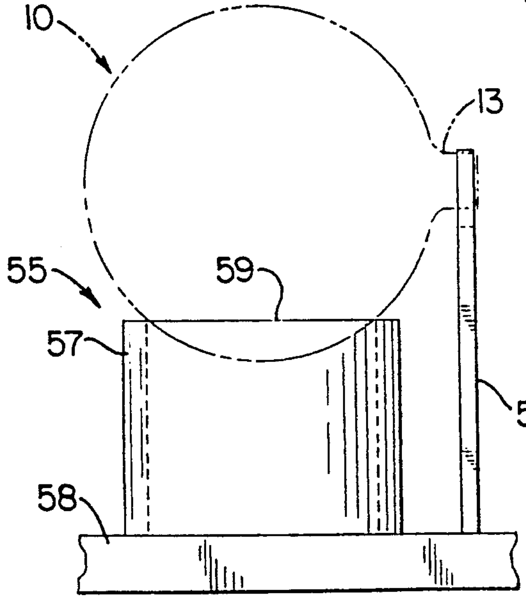
Figure 6B:
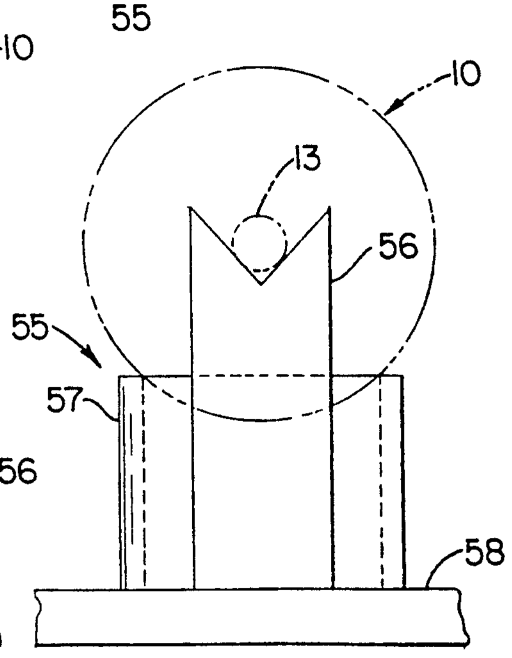

After the bottom of the ornament is marked, another indicia may be formed on the side of the ornament using second fixture 55 shown in FIGS. 6A–6C. Second fixture 55 insures that the laser marking on the ornament will be properly centered and that the top of the marking will line up with the neck of the ornament. In order to establish that the etched pattern will be lined up properly on the front and back of the ornament, the angular position about the bottom of the ornament must be established. This is accomplished by aligning the previously engraved mark on the bottom of the ornament with a reference feature on the fixture. The previously engraved mark on the bottom of the ornament may be aligned vertically, horizontally or at any angle. For example, the marking on the bottom may be aligned with respect to the top surface 59 of cylindrical nest 57. The neck 13 may be held at proper position by holder 56, both of which are mounted on base 58 for proper orientation. The second fixture 55 allows marking of features repeatedly on the ornament in any angle arrangement around the ball.

Figure 7:
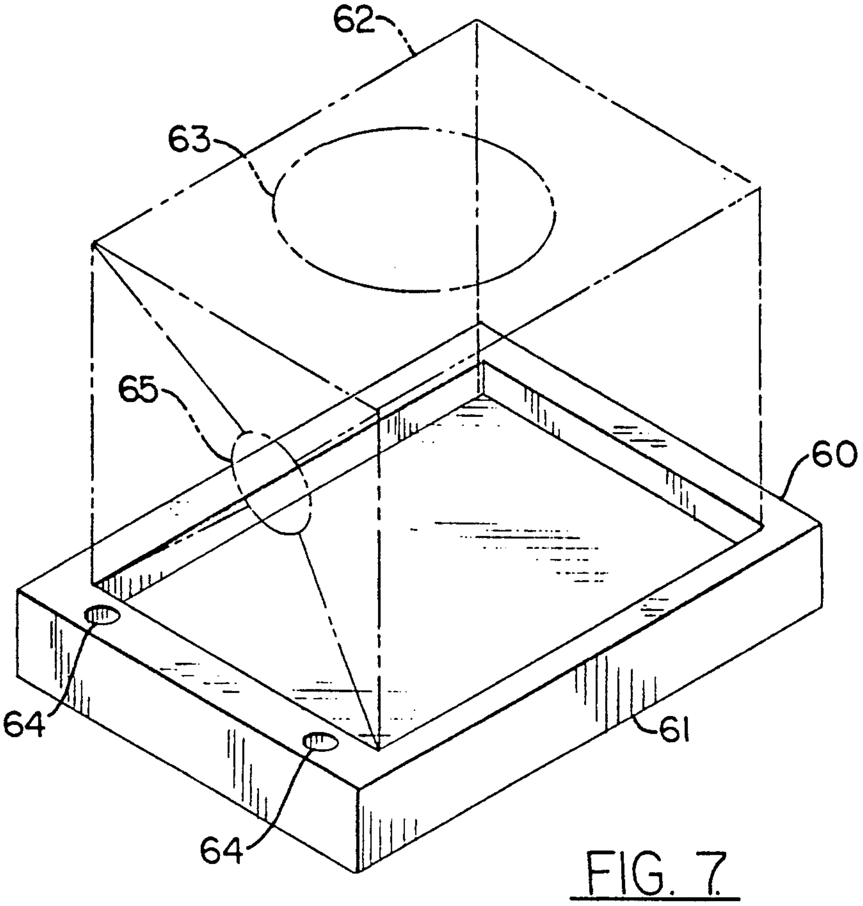
FIG. 7 is a front perspective view of a third fixture which may be used to fabricate a Christmas ornament according to the present invention.

Referring now to FIG. 7, there is illustrated a fixture 60 which may be used to mark two sides of a boxed ornament. As shown in FIG. 7, the boxed ornament is held within a rectangular fixture having flat orthogonal sides 61 for precisely positioning and holding the ornament body. The ornament box 62 may include cutouts 63, only one of which is illustrated, for exposing the ornament surface to be marked. A cutout on the opposite side may also be provided. The box 62 also includes a section 65 for holding the ornament neck. The ornament may be positioned inside the laser marking head 32, using locator holes 64. The design and use of other shuttles or fixtures for positioning the hollow ornament body within the laser marking head will be well known to those having skill in the art and need not be described further.

Following laser marking, an optional clear coating may be applied to the inside of the ornament to seal the inner coating 16. The clear coating may be a clear lacquer, acrylic or other material of suitable clarity. The coating may be applied by spraying or by dipping of the finished product.

As already described, the finished ornament is illuminated from within by placing a miniature Christmas lamp of the type commonly used on Christmas trees in the hollow body. Power for the lamp is provided by a pig-tail lead 14 (FIG. 1), which may obtain its power from a conventional light string. The design of such leads are well known to those having skill in the art. The lead has four principal parts: the socket with lamp, the ornament cap with spring wire retainer, the wire and the plug end which fits into the light string which supplies power. The lamp uses a standard type 2.5-3.5 volt lamp. The socket and wire are of the type currently approved by Underwriters Laboratory for use as decorative lighting. The plug end consists of a plastic end cap through which pass the wires 14 of the connector cord. The wires are terminated by either a crimp-on type connector or by silvering of the wire strands by solder. After passing through the plastic end piece, the silvered wire or crimp-on connector is bent around the plug portion of the end of piece. The portion of the silvered wire or connector which wraps outside the plastic end piece provides the electrical connection when plugged into the light set socket. The ornament cap is fastened to the pig-tailed lead socket by gluing. The ornament cap is also glued to the wire in a similar manner using techniques well-known to those having skill in the art.

As already described, the ornamental indicia is formed in the inner coating layer by relative movement of the laser beam with respect to the hollow ornament body. The geometrical programming of the laser, or of a robot arm, is accomplished by manual input at a laser keyboard or by translating a program produced using CAD software. It will be recognized by those having skill in the art that the pattern provided by a CAD program or other means is a planer pattern. Since the ornamental indicia is reproduced on the nonplanar (spheroidal) surface of the hollow ornament body, the planer pattern must be converted into a nonplanar (spheroidal) pattern so that it may be formed on the hollow body without distortion. A technique for converting a planer pattern to a spheroidal pattern will now be described. It will be understood by those having skill in the art that the technique may be implemented by a stored program which runs on the laser control unit 31. Alternatively, a stored program may be run on a computer such as a personal computer, separate from the laser control unit 31, for converting a known planer pattern into a nonplanar pattern. The nonplanar pattern may then be provided to the laser control unit 31, or to a robot arm.

Figure 8A:
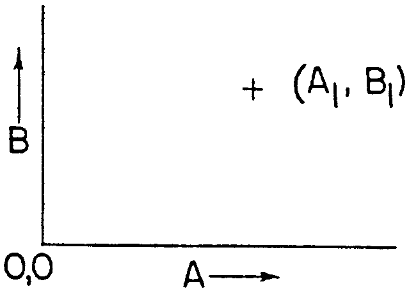
FIGS. 8A and 8B graphically illustrate coordinate systems for converting planar coordinates to spheroidal coordinates according to the present invention.
Figure 8B:
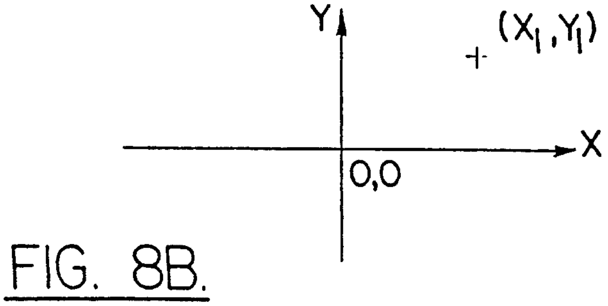

Referring now to FIGS. 8A and 8B, two coordinate systems for use with the converting process are shown. FIG. 8A illustrates the original coordinates of points in the planer plot file. As shown, the coordinate system will be expressed in terms of (A,B). The origin is at the lower left of the field. FIG. 8B illustrates the converted coordinate system of points in the marking field. The origin is at the center of marking field and points are expressed in terms of (X,Y).

The linear conversion factor for changing the (A,B) coordinates to scaled (X,Y) coordinates is shown by Equation 1:

$$L = \frac{H}{B_{MAX} - B_{MIN}} \tag{1}$$

where H is the height of the desired marked pattern.

Values $A_0$ and $B_0$ are defined as $$A_0 = \frac{A_{MAX} + A_{MIN}}{2} \tag{2a}$$

$$B_0 = \frac{B_{MAX} + B_{MIN}}{2} \tag{2b}$$

where $A_{MAX}$, $A_{MIN}$, $B_{MAX}$ and $B_{MIN}$ are the maximum and minimum horizontal and vertical coordinates of the points in the plot file (FIG. 8A) relative to the origin. A compensation factor is used in both the X and Y direction to compensate for distortion in projecting a flat image onto a spherical surface. The compensation factors $P_X$ and $P_Y$ are as follows:

$$P_X = 1 - \frac{R - \sqrt{R^2 - X^2}}{F + R - \sqrt{R^2 - X^2}} \tag{3a}$$

$$P_Y = 1 - \frac{R - \sqrt{R^2 - Y^2}}{F + R - \sqrt{R^2 - Y^2}} \tag{3b}$$

where F is the focal length of the laser; R is the radius of the spherical surface to be marked, i.e. the radius of the hollow ornament body 11, and H is the height dimension of the desired marked pattern.

Figure 9:
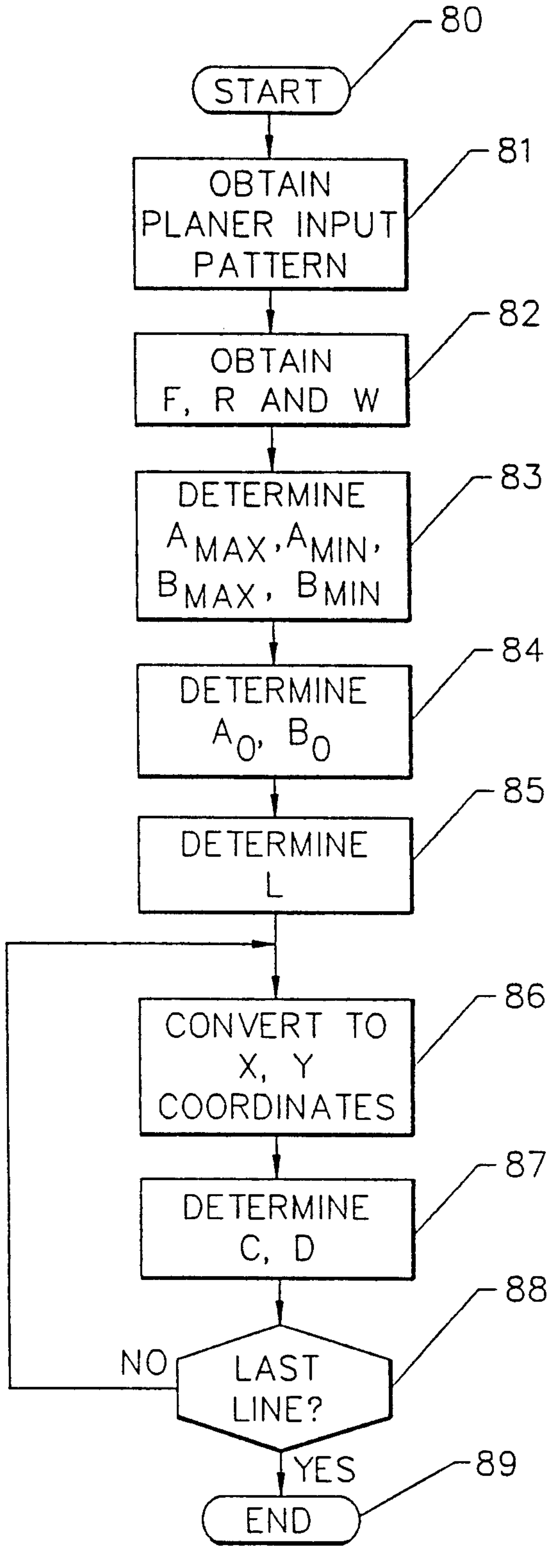
FIG. 9 is a flowchart representation of operational steps for converting a planar pattern to a spheroidal pattern according to the present invention.

Referring to FIG. 9, the operational steps for converting a planer pattern into a spherical pattern will now be described. Upon starting the process (Block 80), the planer pattern is obtained at Block 81 by keyboard input or from a known CAD program. At Block 82, the parameters F, R and W are obtained, by keyboard input from the operator. At Block 83 the parameters $A_{MAX}$, $A_{MIN}$, $B_{MAX}$ and $B_{MIN}$ are determined by determining the maximum and minimum horizontal and vertical coordinates in the planer input pattern.

At Block 84, $A_0$ and $B_0$ are determined using Equations 2a and 2b, respectively. Then, at Block 85, the linear conversion factor L is determined according to Equation 1. The X and Y conversion is then effected by applying Equations 4a and 4b:

$$X = (A - A_0) \cdot P_X \cdot L \tag{4a}$$

$$Y=(B-B_0).P_y.L \quad (4b)$$

Finally, at Block 87 the (X,Y) coordinates are scaled back to plotter units, expressed in terms of (C,D), with the origin at the lower left according to Equations 5a and 5b:

$$C = \frac{X}{P} + A_0 \quad (5a)$$

$$D = \frac{X}{P} + B_0 \quad (5b)$$

The conversion process of Blocks 86 and 87 is performed until the last line of the input pattern is reached at Block 88, and the process ends at Block 89. Accordingly, a planer input indicia is converted to a spherical indicia without distortion.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of fabricating an ornament having a hollow body and an inner coating layer on the inner surface of said hollow ornament body, the method comprising the steps of:

forming a predetermined pattern in said inner coating layer to form an ornamental indicia for said ornament.

2. The method of claim 1 wherein said forming step comprises the step of removing said predetermined pattern from said inner coating layer.

3. The method of claim 1 wherein said forming step comprises the step of directing a laser beam through said hollow body onto said inner coating layer in said predetermined pattern, to form said predetermined pattern in said inner coating layer.

4. The method of claim 3 wherein said laser beam vaporizes said inner coating layer according to said predetermined pattern to form an opening in said inner coating layer having said predetermined pattern.

5. The method of claim 3 wherein said laser beam discolors said inner coating layer according to said predetermined pattern to form a discoloration in said inner coating layer having said predetermined pattern.

6. The method of claim 3 wherein said hollow body is a nonplanar hollow body, and wherein said laser beam directing step comprises the steps of:

defining a planar pattern corresponding to said ornamental indicia;

converting said planar pattern to a nonplanar pattern; and directing said laser beam to form said nonplanar pattern in said inner coating layer.

7. The method of claim 6 wherein said hollow body is a hollow spheroidal body; wherein said converting step comprises the step of converting said planar pattern to a corresponding spheroidal pattern; and wherein said directing step comprises the step of directing said laser beam to form said corresponding spheroidal pattern in said inner coating layer.

8. The method of claim 1 wherein said forming step is followed by the step of placing an illumination source in said hollow body, for passing light through the formed pattern in said inner coating layer and illuminating said ornamental indicia.

9. The product produced by the method of claim 1.

10. The product produced by the method of claim 3.

11. A method of fabricating a Christmas ornament having a hollow body adapted for hanging from a Christmas tree or the like, and an inner coating layer on the inner surface of said hollow ornament body, the method comprising the step of:

impinging a laser beam through said hollow ornament body and onto said inner coating layer in a predetermined pattern, to form an ornamental indicia for said Christmas ornament.

12. The method of claim 11 wherein said laser beam vaporizes said inner coating layer according to said predetermined pattern to form an opening in said inner coating layer having said predetermined pattern.

13. The method of claim 11 wherein said laser beam discolors said inner coating layer according to said predetermined pattern to form a discoloration in said inner coating layer having said predetermined pattern.

14. The method of claim 11 wherein said hollow body is a nonplanar hollow body, and wherein said laser beam directing step comprises the steps of:

defining a planar pattern corresponding to said ornamental indicia;

converting said planar pattern to a nonplanar pattern; and directing said laser beam to form said nonplanar pattern in said inner coating layer.

15. The method of claim 14 wherein said hollow body is a hollow spheroidal body; wherein said converting step comprises the step of converting said planar pattern to a corresponding spheroidal pattern; and wherein said directing step comprises the step of directing said laser beam to form said corresponding spheroidal pattern in said inner coating layer.

16. The method of claim 11 wherein said forming step is followed by the step of placing an illumination source in said hollow body, for passing light through the formed pattern in said inner coating layer and illuminate said ornamental indica.

* * * * *